US007320272B2

(12) United States Patent
Zitterbart

(10) Patent No.: US 7,320,272 B2
(45) Date of Patent: Jan. 22, 2008

(54) HYDRAULIC SYSTEM

(75) Inventor: Thomas Zitterbart, Dietenheim (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 0 days.

(21) Appl. No.: 11/196,518

(22) Filed: Aug. 2, 2005

(65) Prior Publication Data

US 2006/0021341 A1 Feb. 2, 2006

(30) Foreign Application Priority Data

Aug. 2, 2004 (DE) ..................... 10 2004 037 460

(51) Int. Cl.
*F15B 11/08* (2006.01)
*F16K 15/02* (2006.01)
*F15B 13/00* (2006.01)

(52) U.S. Cl. .......................................... 91/420; 91/468

(58) Field of Classification Search .................. 60/468; 91/420, 451, 468; 137/596.12
See application file for complete search history.

(56) References Cited

U.S. PATENT DOCUMENTS 3,662,551 A * 5/1972 Denker ........................ 60/468
4,065,010 A * 12/1977 Worback .................... 91/420
4,112,822 A * 9/1978 Murata ........................ 91/420
5,211,196 A * 5/1993 Schwelm ..................... 91/420
5,214,997 A * 6/1993 Lebret ......................... 91/420
6,095,187 A * 8/2000 Hotchkiss .................... 91/420

FOREIGN PATENT DOCUMENTS

DE 19734479 5/1998
JP 06307407 A 11/1994

OTHER PUBLICATIONS

Will, et al. *Pneumatics and Hydraulics*. Berlin: VEB Verlag Technik, 1981. 175-185.

* cited by examiner

*Primary Examiner*—Thomas E. Lazo
(74) *Attorney, Agent, or Firm*—Alleman Hall McCoy Russell & Tuttle LLP

(57) ABSTRACT

The present application relates to a hydraulic system having a hydraulic supply, a consumer and having a control valve, which is in communication with the consumer by means of a first line and a second line, it being possible for the control valve to be switched into different positions, and the control valve connecting the hydraulic supply to the first line in at least one position. Furthermore, a first valve, which is in communication with the first line and the second line, is provided. Moreover, a third line, serving as a further return, which is in communication with the first valve and does not lead to or open out in the control valve, is also provided, the first valve being connected in such a manner that when pressure is applied to the first line it opens up a connection between the second and third lines.

11 Claims, 7 Drawing Sheets

300
102
220
210
101
C
230
400
A
B
1
0
2
P
T

VALVE POSITION 0

VALVE POSITION 1

VALVE POSITION 2

HYDRAULIC SYSTEM

CROSS REFERENCE TO RELATED APPLICATION

This application claims priority to German Patent Application Serial No. DE 10 2004 037 460.0 filed Aug. 2, 2004, which is hereby incorporated by reference in its entirety for all purposes.

BACKGROUND AND SUMMARY

The present application relates to a hydraulic system having a hydraulic supply, a consumer and having a control valve, which is arranged between the hydraulic supply and consumer and is in communication with the consumer by means of a first line and a second line, it being possible for the control valve to be switched into different positions, and the control valve connecting the hydraulic supply to the first line in at least one position.

Various embodiments of hydraulic systems of this type are known. The hydraulic supply used is generally a pump, the delivery side of which can be connected to the consumer by means of a control valve. The control valve may be designed, for example, as a longitudinal or rotary slide valve. In known hydraulic systems, a first line and a second line lead from the control valve to the consumer and back from the consumer to the control valve, respectively. In this arrangement, it is usually provided that alternatively either the first or the second line is connected to the delivery side of the hydraulic supply, and that the line which is not used as a delivery line serves as a return line.

Irrespective of their particular design, known hydraulic systems are afflicted with the drawback that considerable pressure losses occur in the hydraulic medium as it flows through the control valve, resulting in corresponding losses of power.

Therefore, one object of the present application is to develop a hydraulic system of the type described in the introduction in such a way that the pressure losses in the hydraulic medium flowing through the hydraulic system are reduced.

This object is achieved by a hydraulic system having a first valve, which is in communication with the first line and the second line. Furthermore, a third line, which serves as a further return, is in communication with the first valve and does not lead to, or open out in, the control valve, is provided, the first valve being connected in such a manner that when pressure is applied to the first line it opens up a connection between second line and third line. The result of this arrangement is that not all of the return is routed via the control valve, with the associated pressure losses. The opening-up of the connection between the second line, which in this case serves as a return, and the third line, which likewise serves as a return and is not routed via the control valve, but rather preferably passes the hydraulic medium directly into the tank, results in some of the hydraulic medium experiencing only slight pressure losses. The additional reserves of power obtained as a result are available to the consumer and can be used, for example, for operation of the tool of an excavator.

The valve arrangement according to one embodiment may be single-acting. However, a double-acting design can be particularly advantageous and may be provided in a situation in which, depending on the position of the control valve, either the first line or the second line is connected to the delivery side of the hydraulic supply, and in each case the other line serves as a return line. Accordingly, in a further configuration it is provided that, furthermore, a second valve, which is likewise in communication with the third line, and is also in communication with the first line and the second line and is connected in such a manner that when pressure is applied to the second line the second valve opens up a connection between first line and third line, is also provided. In this case, the second line serves as a feed line and the first and third lines serve as return lines.

A particularly compact arrangement results if the first valve and the second valve are arranged in a common valve block.

The first valve and/or the second valve are advantageously designed as spring-loaded seat valves or as slide valves, which are preferably likewise spring-loaded. Other variants are also conceivable. The control valve is preferably a slide valve. In principle, any desired variants of the control valve are also conceivable.

It is particularly advantageous if the first valve and/or the second valve is designed with additional features as discussed herein.

The consumer of the hydraulic system may, for example, be a piston-cylinder unit which is in communication with the tool of a working machine, for example an excavator, or any other desired drive unit. Examples of suitable tools include a shears mechanism or a hammer, or an arm with scoop cylinder, an arm with double tongs and the like.

The present application may also relate to a valve having a first port, second port and having a third port, and having a first valve body, which can be moved into different positions and in a closed position blocks off a connection between the second port and third port and in an open position opens up a connection between the second port and third port, the valve body being in communication with the first port and being arranged in such a manner that the valve body is moved into the open position when pressure is applied to the first port. The third port can be used for additional discharging of the hydraulic medium, for example into a tank, without the hydraulic medium which is returned in this way passing through the control valve of a hydraulic circuit. It is in this way possible to actively reduce pressure losses in the return.

The valve may also be designed as a double-acting valve. Accordingly, it is possible to provide for there to be a second valve body, which can be moved into different positions and in a closed position blocks off a connection between the first port and the third port and in an open position opens up a connection between the first port and third port, the valve body being in communication with the second port and being arranged in such a manner that the valve body is moved into the open position when pressure is applied to the second port. The valve according to this embodiment connects the return to the third port and therefore to a line which is not routed via the control valve.

As has been stated above, the valve is preferably designed as a seat valve or slide valve. In this context, it is possible to provide for the first valve body and/or the second valve body to be a spring-loaded lifter or slide which is accommodated longitudinally displaceably in a valve block of the valve. The first valve and second valve can be realized by a common slide. In one end region, the lifter may have a conically narrowing valve disk, which in the closed position bears against a valve seat of the valve block. Furthermore, it is possible to provide for the lifter to have a disk in an end region and for a compression spring, which is supported between the disk and the valve block, to be provided. The spring is designed in such a manner that the valve body is moved into its closed position when no pressure is present.

The ports of the valve may be designed as bores in the valve block, the longitudinal axes of which bores run parallel to one another.

Furthermore, it is possible to provide for the lifters to be movable in directions running parallel to one another.

Finally, one embodiment relates to a working appliance, in particular an excavator, having the hydraulic system as described herein, and/or having the valve as described herein. The consumer of the hydraulic system may be a piston-cylinder unit or other drive unit of a shears mechanism, a hammer, a scoop, tongs or double tongs and the like. However, the possible applications for the hydraulic system and valve according to the invention are not restricted to these examples. By way of example, a rotary drive is another possible drive unit.

It is particularly advantageous if the valve is arranged on the consumer or on the tool of an excavator or in the immediate vicinity thereof. In a preferred configuration, the hydraulic medium which is returned via the third line does not have to flow around or through any obstacles or further valves, but rather can be discharged directly, resulting in minimal pressure losses in the return.

DESCRIPTION OF THE DRAWINGS

Further details and advantages are explained in more detail on the basis of an exemplary embodiment illustrated in the drawing, in which.

DETAILED DESCRIPTION

Figure 1A:
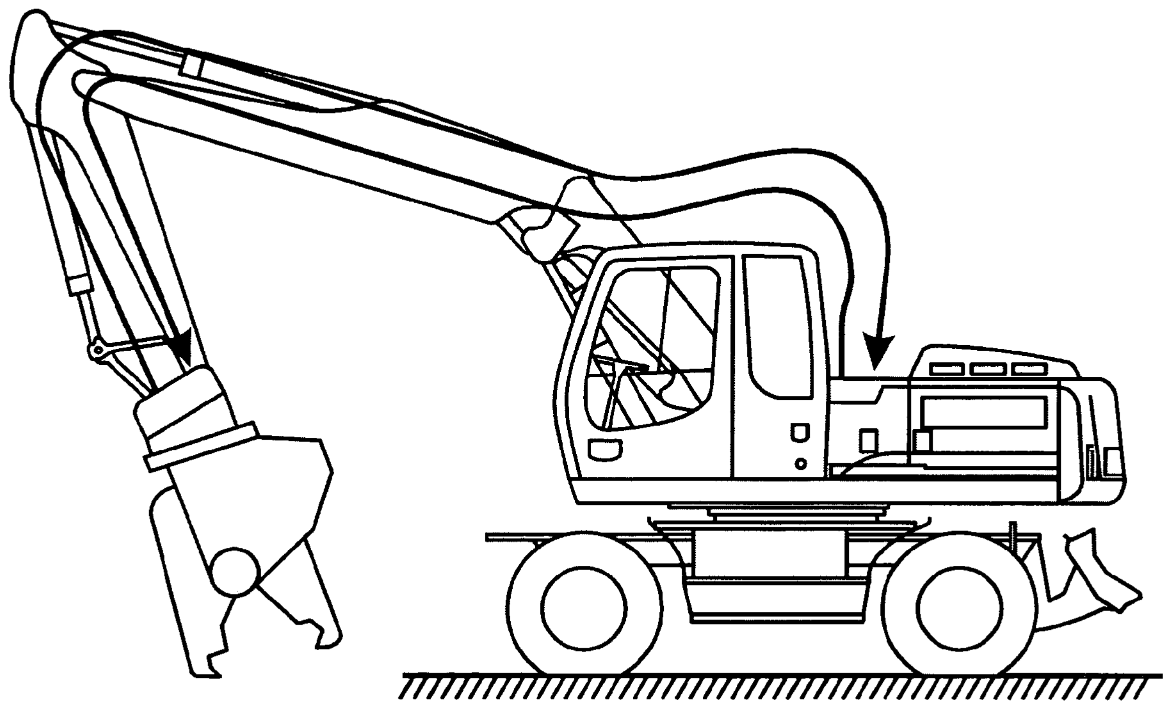
FIGS. 1*a*, 1*b*, and 1*c* diagrammatically depict an excavator with a conventional hydraulic system and also diagrammatically depict a hydraulic system of this type.
Figure 1B:
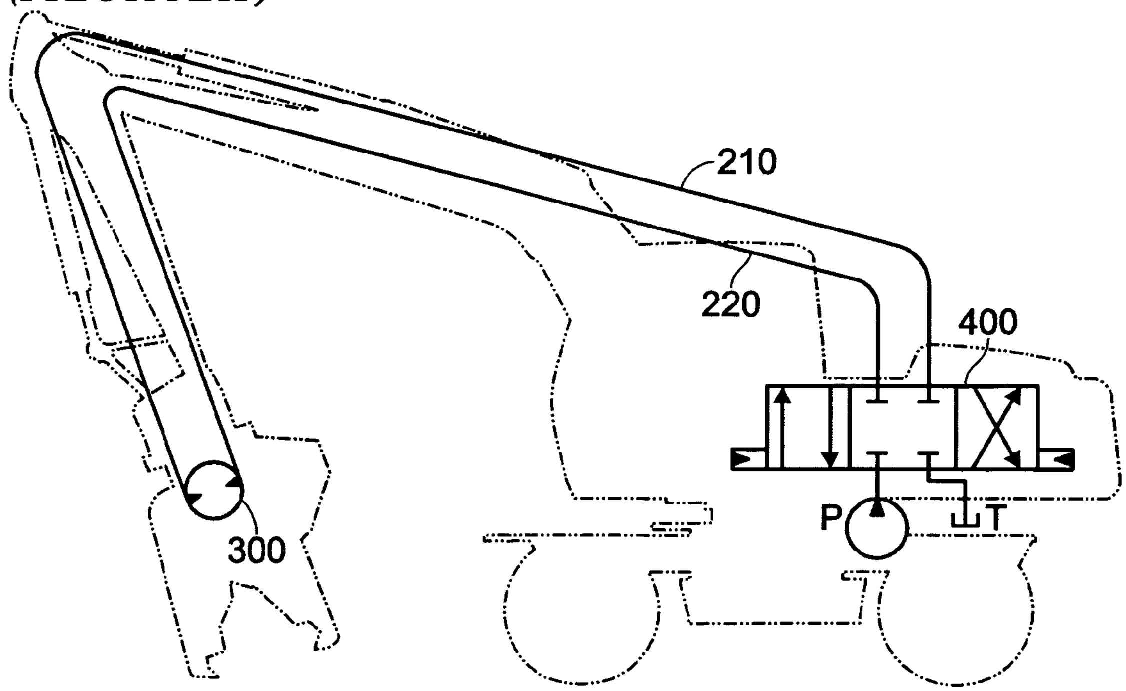

FIGS. 1*a* and 1*b* show diagrammatic side views of an excavator with a hydraulic system according to the prior art. The hydraulic medium is passed from a hydraulic supply (pump P) via a control valve, which is designed, for example, as a slide valve, to the tool 300 or to a piston-cylinder unit or other drive unit which is in communication with the tool. The feed is symbolically represented in FIG. 1*a* by the line which has an arrow pointing at the tool at its end. The other line represents the return, by means of which the hydraulic medium is returned via the control valve to the tank T, with which the pump P is in communication on the suction side. Both the supplied stream of hydraulic medium and the discharged stream of hydraulic medium pass via the control valve 400, i.e. via the slide control. In particular if a shears mechanism is being used as the tool, the problem arises that a greater volumetric flow is returned than is supplied. Since the entire volumetric flow of the oil returns via the slide valve, high pressure losses result.

FIG. 1*b* shows the control valve 400 with consumer 300. The lines 210 and 220, which are in communication with the pump P or with the tank T, depending on the position of the control valve 400, extend between the control valve 400 and the consumer 300.

Figure 1C:
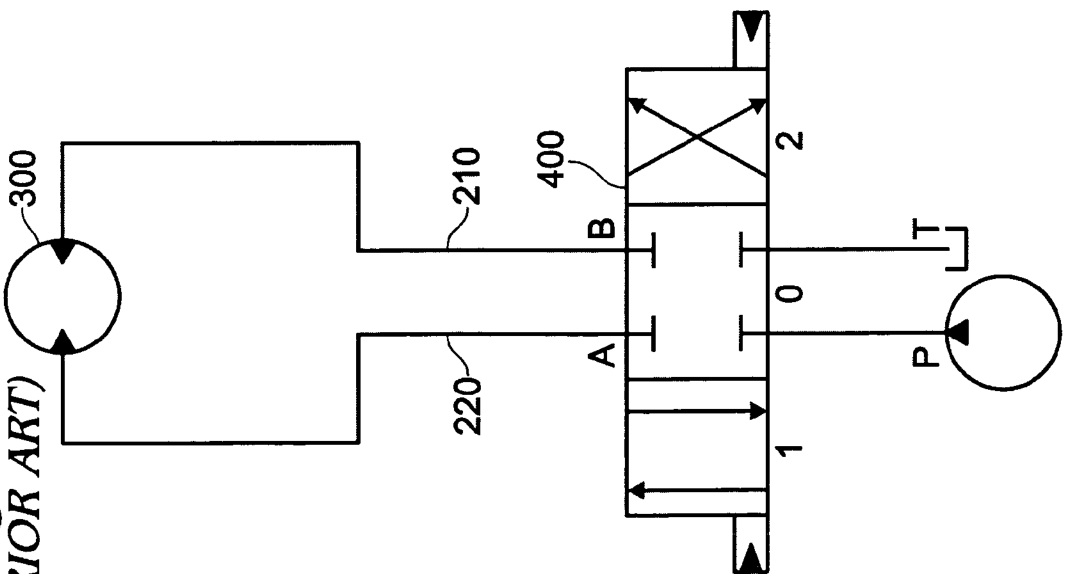

FIG. 1*c* shows a diagrammatic view of the control valve 400 with consumer 300. The control valve 400 is illustrated in a position in which none of the lines 210, 220 are in communication with the pump P or the tank T. Depending on the position of the control valve 400, the hydraulic supply (pump P) is connected to port A, i.e. to line 220, or else the latter is connected to the tank T. The same applies to port B and the line 210. In both cases, the entire volumetric flow of oil is returned to the tank via the control valve 400, resulting in high pressure losses.

Figure 2:
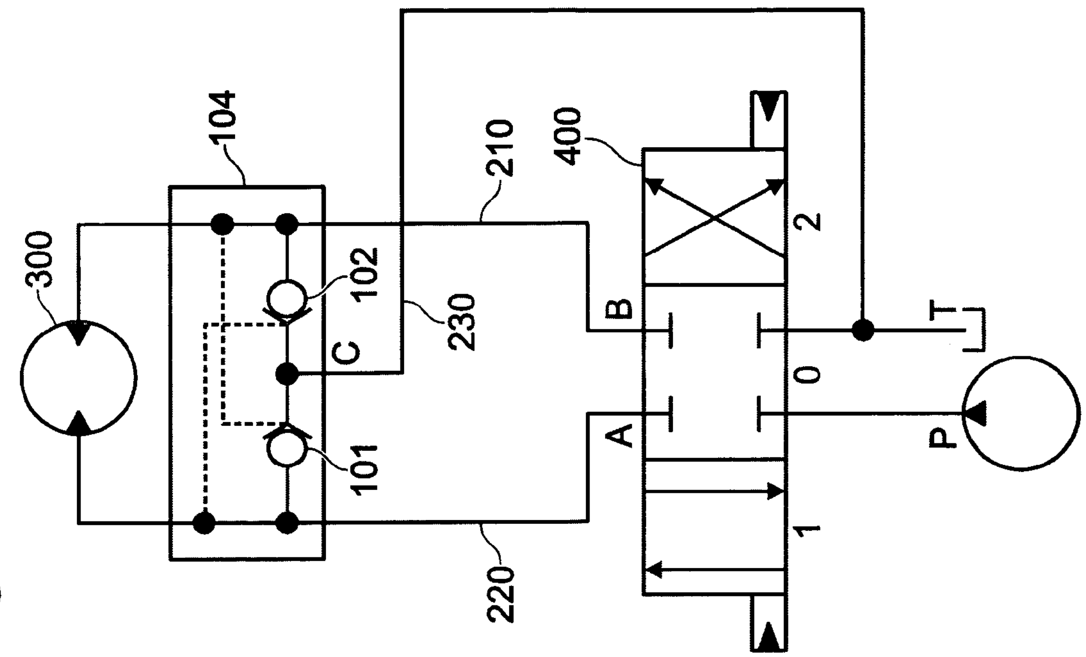
FIG. 2 diagrammatically depicts a hydraulic system.

FIG. 2 diagrammatically depicts a hydraulic system according to one embodiment of the present application. Reference numeral 300 denotes a consumer, which is formed, for example, by the piston-cylinder unit of a shears mechanism of an excavator. Other applications are also conceivable. Furthermore, there is a control valve designed as a slide valve (longitudinal or rotary slide) 400, which in the present exemplary embodiment is designed as a 4/3-way valve. Two lines 210 and 220 lead from the control valve 400 to and from the consumer 300. Depending on the position of the control valve 400, the line 210 is connected to the hydraulic supply (P) and the line 220 to the tank (T), or the line 210 is connected to the tank (T) and the line 220 to the hydraulic supply (P). Accordingly, either the line 210 or the line 220 serves as a feed line, and in each case the other line serves as a return line. In a third switching position, illustrated in FIG. 2, neither of the lines 210 and 220 is connected to the hydraulic supply.

If the line 210 is connected to the hydraulic supply, the pressure is applied not only to the consumer 300, but also to the valve 101, as indicated by the dashed line which runs from the line 210 to the valve 101. The application of pressure to the valve 101 opens the latter so as to open up a connection between the return line 220 and the line 230. Some of the hydraulic medium passes directly into the tank via the valve 101 and the line 230, and consequently does not flow through the control valve 400. The remainder of the hydraulic medium flowing back passes through the line 220 into the control valve 400 and through the latter into the tank. On account of the fact that some of the hydraulic medium flowing back is passed into the tank not via the control valve 400 but rather directly through the line 230, the pressure loss is reduced, with the result that a greater power is available to the consumer 300.

A corresponding effect results if, after a change in the switching position of the control valve 400, the line 220 is connected to the hydraulic supply P. In this case, application of pressure opens the valve 102, and a connection between the line 210, which in this case acts as a return line, and the outflow line 230 is produced via the open valve 102, so that the hydraulic medium flows out via the lines 210 and 230. The application of pressure to the valve 102 through the line 220 is indicated by the dashed line running from the line 220 to the valve 102.

As can be seen from FIG. 2, the valves 101 and 102 are arranged between control valve and consumer 300.

Figure 3:
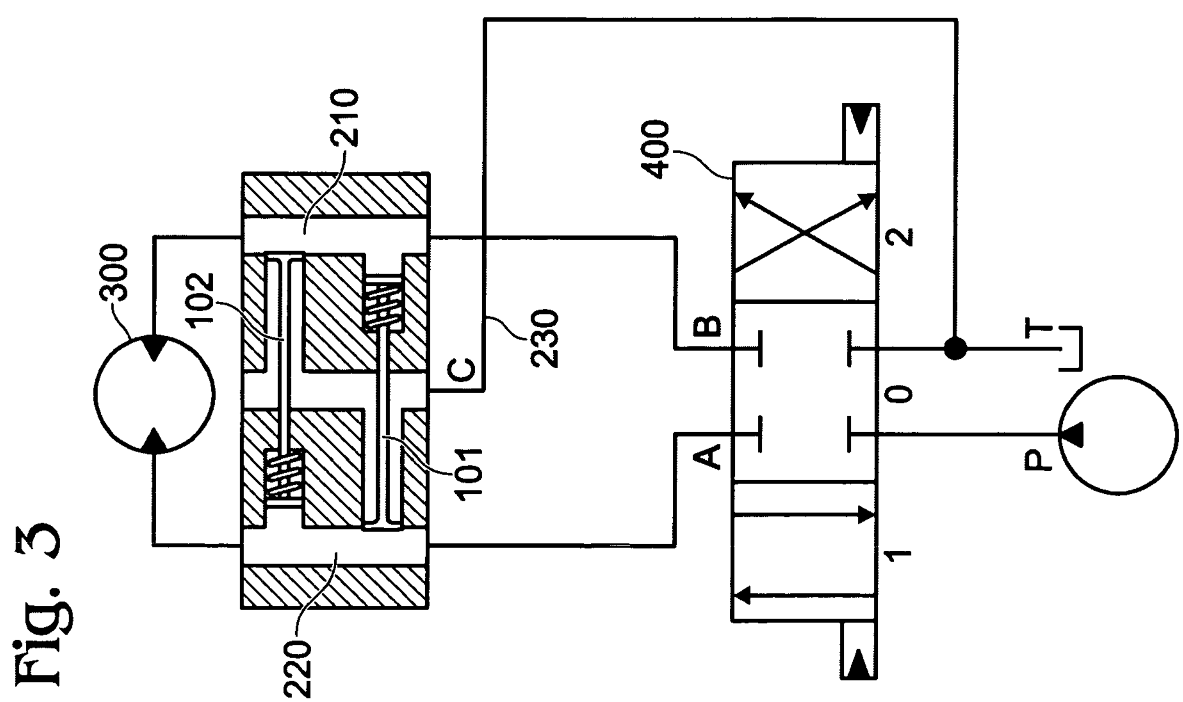
FIG. 3 shows a further illustration of the valve.

FIG. 3 shows a further illustration of the valves 101 and 102, which are each in communication with the lines 210 and 220 and with the line 230. The valves 101 and 102 are spring-loaded seat valves. If pressure is applied to line 210, the valve body of the valve 101 is shifted to the left, producing a connection between the lines 220 and 230, so that hydraulic medium flows out not only through the line 220 but also through the line 230. A connection to the pressure line 210 is not produced. The valve 102 remains closed. It is pressed into its seat on account of the pressure in the line 210 and prevents the hydraulic medium from flowing out of the pressure line 210 into the outflow line 230.

A correspondingly reversed mode of operation results in the valve 102 if the line 220 is used as delivery line. In this case, the valve body of the valve 102 is moved to the right while the valve 101 remains closed. The lines 210 and 220 are connected to the control valve 400 via the ports A and B and are in each case connected to the hydraulic supply P or to the tank T, depending on the position of the control valve 400.

Figure 4:
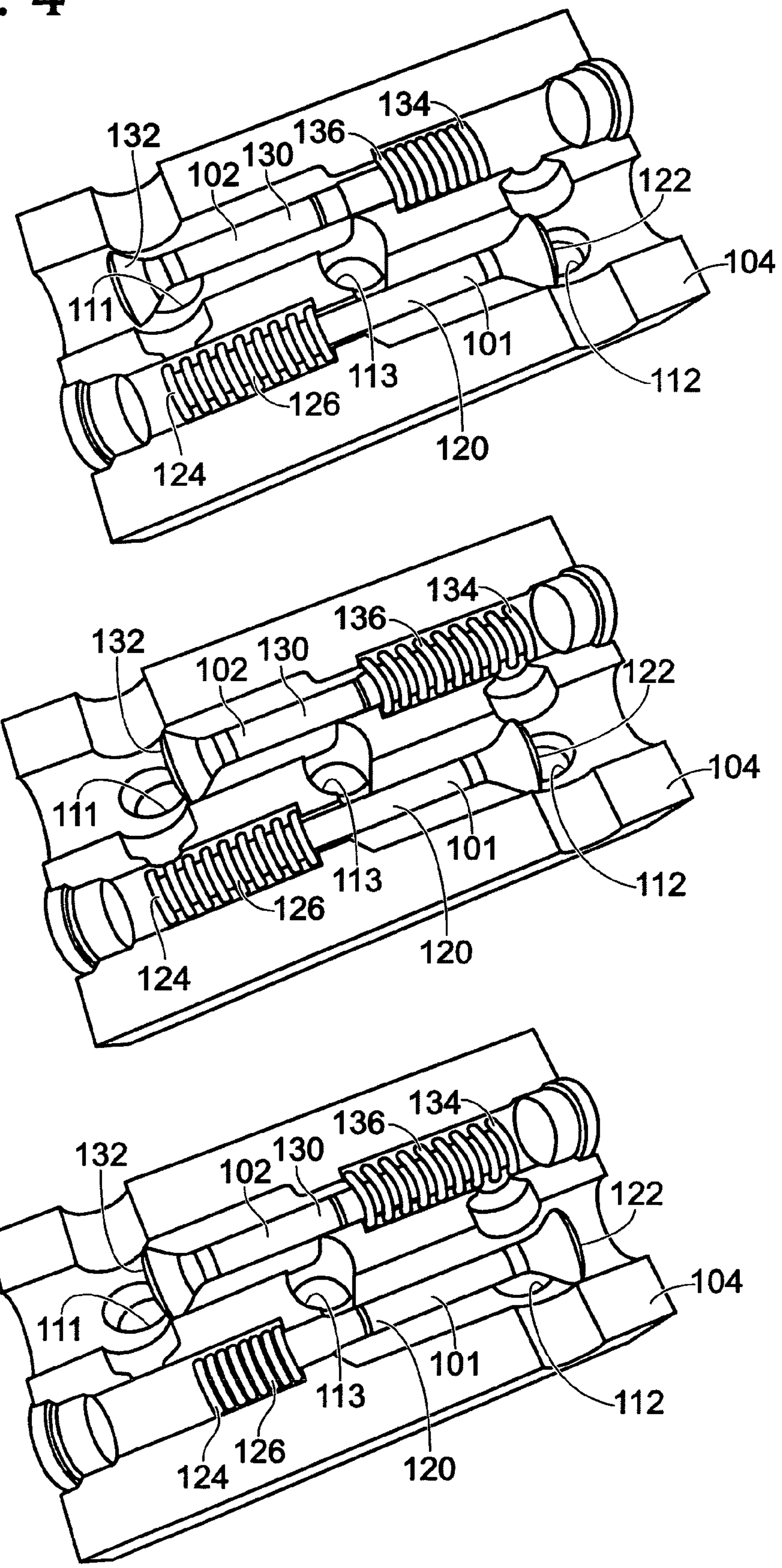
FIG. 4 shows perspective views of the valve in various switching positions.

FIG. 4 shows perspective illustrations of the valves 101 and 102, which are accommodated in a common valve block 104. The ports 111, 112 and 113 are located in the valve block 104. As can be seen from FIG. 4, the valves 101 and 102 each comprise a valve body 120 and 130 with a conically narrowing valve disk 122 and 132. The disk 124 and 134 is located in the other end region of the valve body 120 and 130. The compression spring 126 and 136 is located between the disk 124 and 134 and the valve block 104.

The ports 111 and 112 are in communication with the lines or form part of the lines which lead from a control valve to a consumer or from a consumer to a control valve. These lines are denoted by reference numerals 210 and 220 in FIGS. 2 and 3. In accordance with FIG. 4, the port 113 is in communication with the line 230, which is not routed via the control valve, but rather opens out into, or leads to, a tank.

As can also be seen from FIG. 4, the valve bodies (lifters) 120 and 130 are designed to be movable in the valve block 104. Each of the valves 101 and 102 can move into a closed position and an open position. In its closed position, the valve 101 blocks off a connection between the ports 112 and 113 and in its open position opens up this connection. The opening-up of the connection between the ports 112 and 113 is effected by the valve lifter 120 being moved to the right, in accordance with FIG. 4, with the result that the valve disk 122 is moved out of its seat and opens up the connection between the ports 112 and 113. The movement of the valve lifter 120 takes place counter to the force of the spring 126 and is brought about by pressure being applied to the port 111. The pressurized hydraulic medium which is present at the port 111 or flows through it moves the valve lifter 120 to the right, as can be seen from the bottom illustration in FIG. 4. The return, which enters the port 112, flows through a bore in the valve block 104 and at least partially to the port 113 and, from there, into the tank without passing through a control valve. If the line which is in communication with the port 111 is switched to a pressure-free position, the spring 126 moves the valve lifter 120 back into its left-hand limit position, which can be seen, for example, from the middle illustration of FIG. 4. In this case, the connection between the ports 112 and 113 is blocked.

If the line which is in communication with the port 112 is connected to the hydraulic supply, the operation described above is carried out in a corresponding way for the valve lifter 130 of the valve 102 illustrated at the top. On account of the compressive force acting on its end region, it is moved to the left, thereby opening up the connection between the ports 111 and 113. In this switching position, which can be seen from the upper illustration in FIG. 4, the medium flowing back can flow into the valve block 104 through port 111 and can leave the valve block at least in part via the port 113.

Therefore, depending on the position of the valves 101 and 102, either the port 111 or the port 112 is connected to the line which leads to the tank and opens out at the port 113, so that the hydraulic medium can flow out with a low pressure loss. The movement of the valves into their open position in each case takes place on account of the pressure in the lines which are in communication with the hydraulic supply.

Depending on the line at which pressure is present, the ports 111 and 112 are used either to actuate the valves or to route the return to the port 113.

Figure 5:
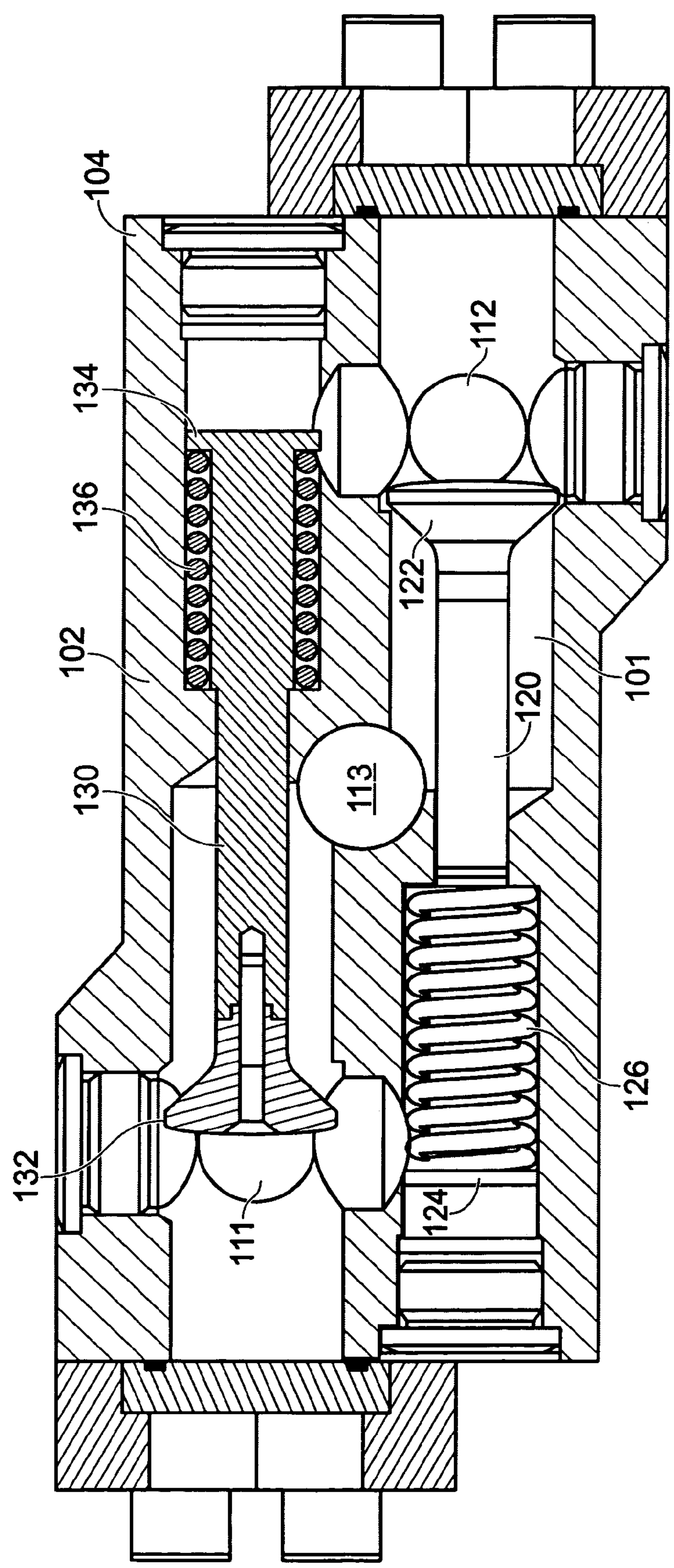
FIG. 5 shows a sectional illustration of the valve.

FIG. 5 shows a sectional illustration of the valve in accordance with FIG. 4. This sectional illustration reveals the ports 111 to 113 and the valve lifters 120 and 130, which are arranged parallel and can be moved in parallel directions. In the position illustrated in FIG. 5, pressure is present at port 112, with the result that the valve lifter 130 illustrated at the top has moved into its left-hand limit position. In this position, the valve disk 132 opens up a connection between ports 111 and 113. At the same time, the application of pressure at port 112 causes the valve 101 to be pressed into its closed position.

The line regions which are connected to ports 111 to 113 and run in the valve block 104 may end in the valve block 104 or may also be designed to continue through it. By way of example, therefore, it is conceivable for lines which end in the valve block 104 to branch off from the lines 210 and 220 shown in FIG. 2. Alternatively, it is also conceivable for the lines 210 and 220 to be routed through the valve block 104, as shown in FIG. 3. The line 230 which leads to the tank and opens out at port 113 may extend on one or both sides of the valve block 104.

Figure 6:
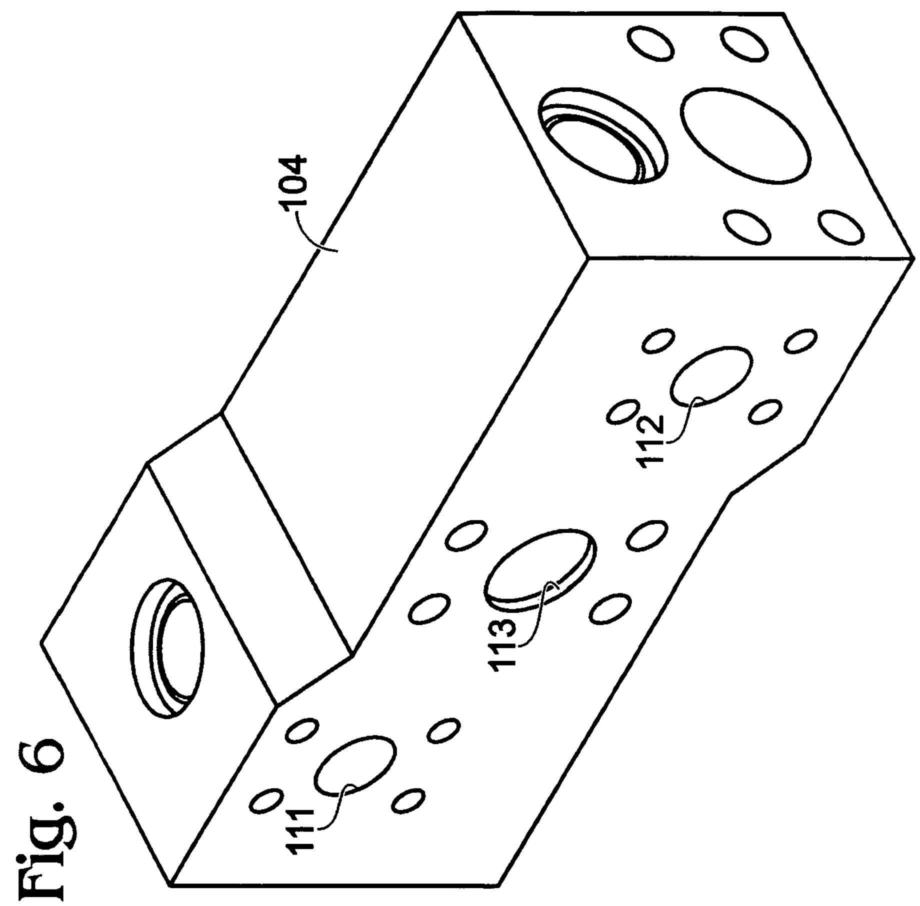
FIG. 6 shows a perspective view of the valve block.

FIG. 6 shows a perspective view of the valve block 104 with ports 111 to 113 arranged on both sides. The further openings illustrated in the valve block are used mainly to mount the valve lifters.

Figure 7A:
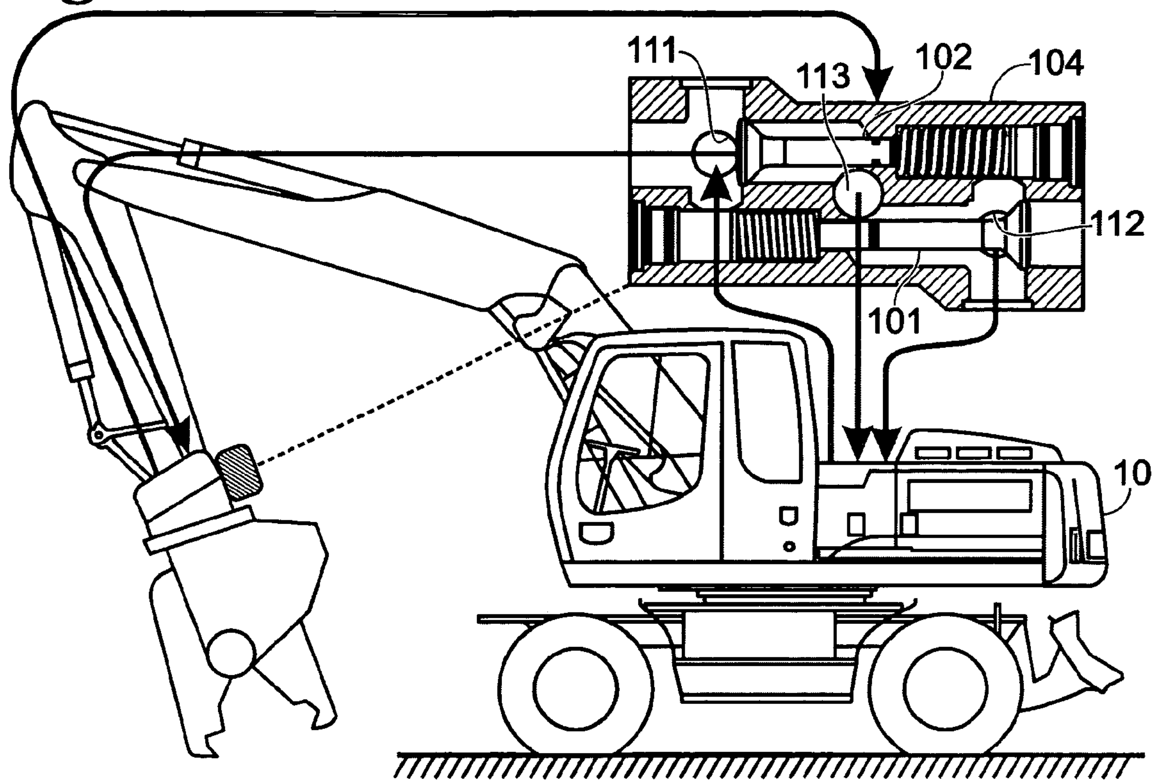
FIGS. 7*a* and 7*b* diagrammatically depict an excavator having the hydraulic system.
Figure 7B:
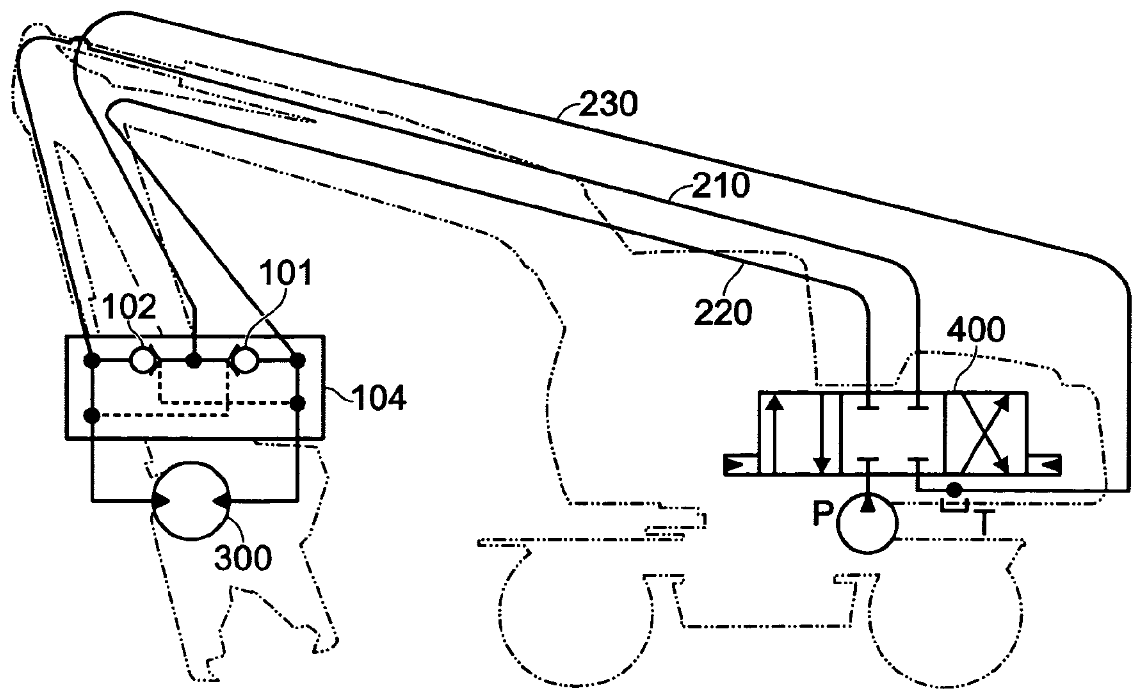

FIG. 7*a* and FIG. 7*b* diagrammatically depict an excavator having the hydraulic system according to the invention. As can be seen from the figures, the pressurized hydraulic medium, after it has passed through the control valve 400, which is only illustrated in FIG. 7*b*, flows into the valve block 104, with the result that the valve 101 illustrated at the bottom in FIG. 7*a* is moved into its open position. The pressurized hydraulic medium flows through the valve block 104 and is finally passed to the tool.

The return enters the valve block 104 via port 112 in accordance with FIG. 4. On account of valve 101 being open, the return leaves the valve block 104 not only via the outlet opening, which is aligned with the port 112, but also via the port 113 leading directly to the tank.

A corresponding functionality results for the illustration shown in FIG. 7*b*. When pressure is applied to the line 220, the valve 102 is opened, producing a connection between the return line 210 and the line 230 leading to the tank T. The valve 101 remains closed.

If pressure is applied to the line 210 as a result of corresponding switching of the control valve 400, valve 101 is opened, producing a connection between the return line 220 and line 230. Valve 102 remains closed.

Figure 8:
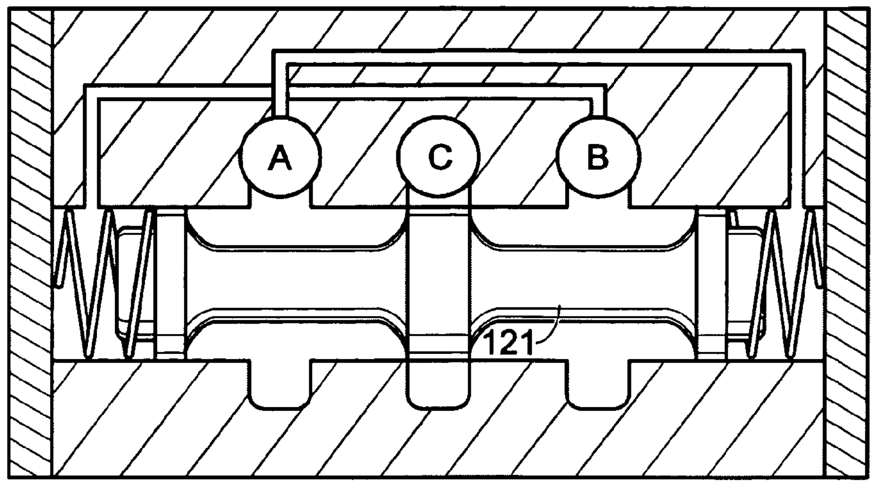
FIG. 8 illustrates the valve as a slide valve in various positions.
Figure 8:
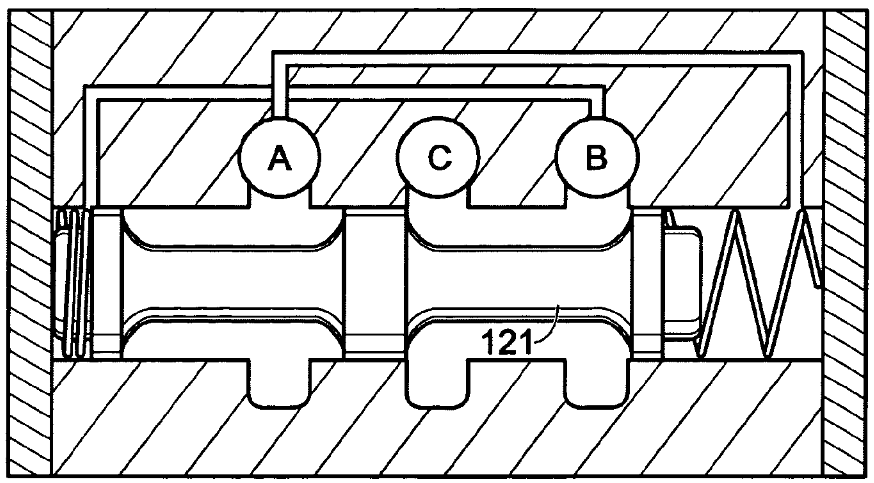
Figure 8:
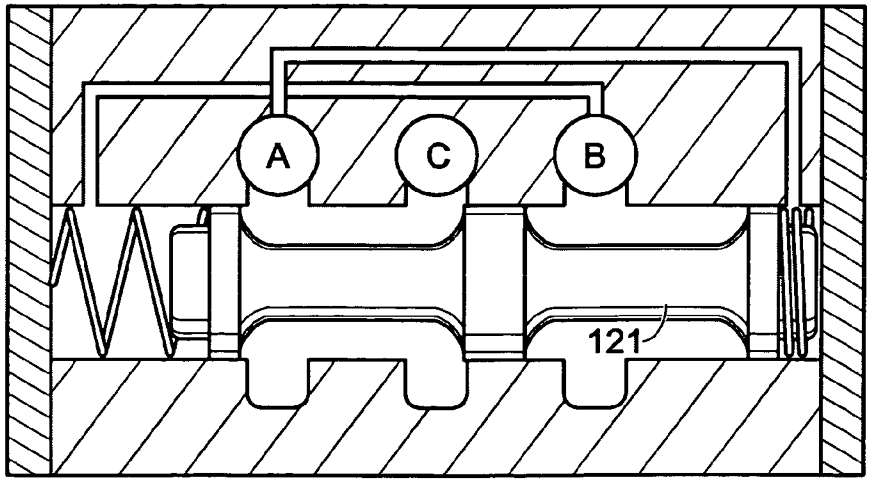

FIG. 8 shows the valve according to one embodiment as a slide valve having the slide 121. It can be used, for example, with a control valve in accordance with FIG. 3. In valve position 0 shown at the top, port C, which is in communication with the tank T, is blocked, so that a connection is not produced either between ports A and C or between ports B and C. If port A is connected to the hydraulic source, in accordance with the middle illustration in FIG. 8, the slide 121 is shifted to the left, counter to the force of the spring arranged on the left-hand side, opening up a connection between port B (return to the control valve) and port C (return to the tank).

If, instead, port B is acting as a pressure-carrying port, the slide 121 is shifted to the right counter to the force of the spring arranged on the right-hand side (bottom illustration in FIG. 8), opening up a connection between port A (return to the control valve) and port C (return to the tank).

The valve according to one embodiment is advantageously controlled directly and not by pilot control, as is known from the prior art. This direct actuation allows the control pressure to be altered at the seat valve.

Furthermore, it is possible to provide for the valve or valves according to the invention to be integrated in the block of the control valve 400 illustrated in FIG. 7*b*, for example. In principle, the valve(s) can be arranged at any desired position between consumer and control valve.

The valve block of the valve may be arranged in the region of the tool. It is highly advantageous if the valve is integrated in the mounted implement, as illustrated in FIGS. 7*a* and 7*b*. In this way, the return can be diverted as close as possible to the tool. Although the return still has to be fed back to the tank through lines, it preferably does not otherwise have to flow around any obstacles which would lead to losses of power. As an alternative to being arranged on the tool, by way of example it is also possible for the valve block to be fitted in the region of the chassis, since corresponding losses also occur here. The above-described problem of a high oil return arises in particular in the case of demolition tools.

Arranging the valve on the mounted implement brings with it the additional advantage that the valve can be removed together with the mounted implement, so that any desired excavator (or other working appliance) can be used and can then pick up the mounted implement together with the valve, for example by means of a quick-fit coupling.

This allows the valve to be exchanged together with the working tool, so that it is only added when it is actually necessary.

In principle, the valve can be arranged as desired. It may also be integrated in the control valve. It is also conceivable for it to be integrated in the valve block of a quick-fit coupling.

The valve arrangement illustrated in the drawings relates to feed and return, as is usually required. If only a single-acting valve is desired, the valve illustrated may also be of only half-sided design.

The embodiments described herein can be used, for example, in combination with tools on excavators. If a hammer is used, there are not just two lines for feed and return, but also an additional line which leads directly back into the tank. If used for a system of this type, it is always possible for this power to be deployed, since a corresponding partial volumetric flow is returned directly to the tank. This results in the advantage that one line always leads into the tank and the other line is not disconnected, as is often the case in the prior art. A particularly advantageous application therefore results from the fact that in the case of working appliances which already have three existing lines, these lines can be utilized, with one line serving as a return line into the tank.

The valve is preferably designed as a seat valve with favorable fluid-dynamic properties, resulting in the minimum possible pressure losses.

The invention claimed is:

1. A hydraulic system comprising: a hydraulic supply, a consumer and having a control valve, which is arranged between the hydraulic supply and consumer and is in communication with the consumer via a first line and a second line, where the control valve can be switched into different positions, and the control valve connecting the hydraulic supply to the first line in at least one position, wherein a first valve, which is in communication with the first line and the second line is provided, and wherein a third line, which is in communication with the first valve and does not lead to or open out in the control valve, is provided, the first valve being connected in such a manner that when pressure is applied to the first line it opens up a connection between second line and third line, wherein the control valve, in at least one position, connects the hydraulic supply to the second line, and wherein a second valve, which is likewise in communication with the first line, the second line and the third line and is connected in such a manner that when pressure is applied to the second line it opens up a connection between first line and third line, is also provided and where the first valve or the second valve are designed as spring-loaded seat valves or as slide valves.

2. The hydraulic system as claimed in claim 1, wherein the first valve and the second valve are arranged in a common valve block.

3. The hydraulic system as claimed in claim 1 further comprising an excavator, where the consumer is coupled in the excavator.

4. The hydraulic system as claimed in claim 1, wherein the consumer is a piston-cylinder unit which is in communication with the tool of an excavator.

5. A valve having two lines configured to lead to a consumer and three ports separate from the two consumer lines, said three ports including a first port, second port and a third port, the valve having a first valve body, which can be moved into different positions and in a closed position blocks off a connection between the second port and third port and in an open position opens up a connection between the second port and third port, the valve body being in communication with the first port and being arranged in such a manner that the valve body is moved into the open position when pressure is applied to the first port, wherein a second valve body, which can be moved into different positions and in a closed position blocks off a connection between the first port and third port and in an open position opens up a connection between the first port and third port, is provided, the valve body being in communication with the second port and being arranged in such a manner that the valve body is moved into the open position when pressure is applied to the second port, wherein the first valve body or the second valve body is a spring-loaded lifter or slide which is accommodated longitudinally displaceably in a valve block of the valve.

6. The valve as claimed in claim 5, wherein the lifter, in one end region, has a conically narrowing valve disk which in the closed position bears against a valve seat of the valve block.

7. The valve as claimed in claim 6, wherein the lifter, in an end region, has a disk, and wherein a compression spring which is supported between the disk and the valve block, is provided.

8. The valve as claimed in claim 5, wherein the lifter can move in directions running parallel to one another.

9. The valve as claimed in claim 7 further comprising, the consumer being coupled in the excavator.

10. The excavator as claimed in claim 9, wherein a consumer is a drive unit which is in communication with a shears mechanism, a hammer, tongs, or a scoop of the working appliance.

11. A valve having a first port, second port and having a third port, and having a first valve body, which can be moved into different positions and in a closed position blocks off a connection between the second port and third port and in an open position opens up a connection between the second port and third port, the valve body being in communication with the first port and being arranged in such a manner that the valve body is moved into the open position when pressure is applied to the first port, wherein a second valve body, which can be moved into different positions and in a closed position blocks off a connection between the first port and third port and in an open position opens up a connection between the first port and third port, is provided, the valve body being in communication with the second port and being arranged in such a manner that the valve body is moved into the open position when pressure is applied to the second port, and wherein the first valve body or the second valve body is a spring-loaded lifter or slide which is accommodated longitudinally displaceably in a valve block of the valve.

* * * * *